(12) United States Patent
Ludwig et al.

(10) Patent No.: US 9,916,020 B2
(45) Date of Patent: Mar. 13, 2018

(54) SYSTEM, METHOD AND COMPUTER PROGRAM FOR OPERATING A PLURALITY OF COMPUTING DEVICES

(75) Inventors: Alf Ludwig, Bietigheim-Bissingen (DE); Roland Claus Beck, Stuttgart (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 265 days.

(21) Appl. No.: 13/383,725

(22) PCT Filed: Jul. 1, 2010

(86) PCT No.: PCT/IB2010/053028
§ 371 (c)(1),
(2), (4) Date: Jan. 12, 2012

(87) PCT Pub. No.: WO2011/007288
PCT Pub. Date: Jan. 20, 2011

(65) Prior Publication Data
US 2012/0105479 A1 May 3, 2012

(30) Foreign Application Priority Data
Jul. 14, 2009 (EP) .................................... 09165399

(51) Int. Cl.
*G06F 3/14* (2006.01)
*G06F 3/038* (2013.01)
(Continued)

(52) U.S. Cl.
CPC ................ *G06F 3/038* (2013.01); *G06F 3/14* (2013.01); *G06F 3/1454* (2013.01); *G09G 5/12* (2013.01);
(Continued)

(58) Field of Classification Search
None
See application file for complete search history.

(56) References Cited

U.S. PATENT DOCUMENTS 6,266,082 B1 * 7/2001 Yonezawa ........ G08B 13/19645
348/14.02
6,493,008 B1 12/2002 Yui
(Continued)

FOREIGN PATENT DOCUMENTS

| JP | 11305917 A | 11/1999 |
|----|------------|---------|
| JP | 2007206428 A | 8/2007 |
| JP | 2008040190 A | 2/2008 |

OTHER PUBLICATIONS

Chroma Key; Wikipedia, the free encyclopedia; http://en.wikipedia.org/wiki/Chroma_key.
(Continued)

*Primary Examiner* — Xiao M. Wu
*Assistant Examiner* — Steven Elbinger

(57) ABSTRACT

A computing system includes a computing device and an image composing unit for generating a common video signal for a display device. The computing device is adapted to partition a display area of the display device into a plurality of sections. One of the sections is related to another computing device. The computing device is further adapted to receive an input signal from an input device. The input signal is relatable to a position within the display area. The computing device is further adapted to provide the other computing device with the input signal depending on the position being in one of the sections related to the other computing device.

21 Claims, 2 Drawing Sheets

(51) Int. Cl.
*G09G 5/12* (2006.01)
*G09G 5/14* (2006.01)

(52) U.S. Cl.
CPC ............ *G09G 5/14* (2013.01); *G06F 3/1446* (2013.01); *G06F 2203/0383* (2013.01); *G09G 2340/10* (2013.01); *G09G 2340/12* (2013.01); *G09G 2360/06* (2013.01); *G09G 2360/08* (2013.01)

(56) References Cited

U.S. PATENT DOCUMENTS

| | | | |
|---|---|---|---|
| 6,859,236 B2* | 2/2005 | Yui | 348/584 |
| 2001/0005904 A1 | 6/2001 | Wood | |
| 2001/0033340 A1 | 10/2001 | Yui | |
| 2002/0030635 A1* | 3/2002 | McGowan | G09G 5/12 345/5 |
| 2003/0020757 A1 | 1/2003 | Aratani et al. | |
| 2004/0155902 A1* | 8/2004 | Dempski et al. | 345/757 |
| 2005/0190150 A1* | 9/2005 | Drake | G05G 9/04737 345/156 |
| 2008/0201644 A1 | 8/2008 | Partani et al. | |
| 2008/0211966 A1* | 9/2008 | Iwamoto | 348/587 |
| 2009/0070404 A1* | 3/2009 | Mazzaferri | G06F 9/542 709/202 |
| 2009/0122011 A1* | 5/2009 | Timokhin et al. | 345/163 |
| 2009/0310023 A1* | 12/2009 | Nakayama | 348/584 |

OTHER PUBLICATIONS

KVM Switch; Wikipedia, the free encyclopedia; http://en.wikipedia.org/wiki/KVM_switch.

* cited by examiner

SYSTEM, METHOD AND COMPUTER PROGRAM FOR OPERATING A PLURALITY OF COMPUTING DEVICES

FIELD OF THE INVENTION

The present invention relates to a computing system for operating a plurality of computing devices, the computing system comprising one of the computing devices and an image composing unit for generating a common video signal for a display device.

The present invention further relates to a method for operating a computing system for operating a plurality of computing devices, the computing system comprising one of the computing devices and an image composing unit for generating a common video signal for a display device; and the present invention further relates to a corresponding software.

BACKGROUND OF THE INVENTION

A well known computing system for operating a plurality of computing devices is a system using the remote desktop solution. In computing, the term "remote desktop" refers to software or an operating system feature allowing graphical applications to be run remotely on a server, while being displayed locally. Remote desktop solutions are not supported by all operating systems. All graphics information is transferred via a communication channel (e.g. LAN: Local Area Network) and therefore has reduced display performance.

The following further components for combining a plurality of computing devices are known: a "picture-in-picture" or "chroma key" display solution, keyboard-video-mouse switches (KVM-switches) and remote virtualization solutions (virtual machines).

The chroma key solution shows the screen of two or more computing devices on a single display but still requires separate input devices for each system.

Patent application US 2001/0033340 A1 depicts an apparatus for composing image data of a main picture and image data of a sub-picture by a chroma key process.

The KVM-switch solution allows an operation of multiple systems from one set of input devices, but the user must switch manually between the systems. Even if the screen of all devices would be combined on one display using a Picture-in-Picture or Chroma Key solution, the user still has to know which part of the display is contributed by which computing device to select the appropriate one for switching the input devices to that computing device.

SUMMARY OF THE INVENTION

It is an object of the invention to provide a simple, yet safe and reliable system, method and computer program for operating a plurality of computing devices.

According to the invention the one computing device is adapted for: partitioning a display area of the display device into a plurality of display area sections, wherein at least one of the display area sections is related to at least one other computing device; receiving an input signal from at least one input device, wherein the input signal is relatable to a position within the display area; and providing the at least one other computing device with the input signal depending on the position being in one of the display area sections related to said other computing device.

The computing system for operating a plurality of computing devices according to the invention is based on the concept that one dedicated device, the one computing device, has guaranteed control over the input signal from the at least one physical input device. The one computing device provides the other computing device(s) with a "virtual input signal" of the input device. The one computing device is a master computing device with respect to the other computing devices. Furthermore the computing system is arranged to supply a combined video signal, with contributions from all devices to a single display device. The computing system allows a high integration quality of other computing devices or systems to generate a complete computing system.

The partitioning of the display area is not fixed, and can be changed at any time during system operation, as defined by the computing system. The shape of each display area section is not limited to a special type of shape like for example a rectangular shape.

The used display device (video hardware) and the (physical) input devices can be industrial standard products: No modifications or only minor modifications are necessary to the other computing devices which are slave computing devices with regard to the one computing device. Integration works even if the other computing device is not at all aware of the presence of the one computing device (perhaps with lower "integration quality").

The computing system according to the invention allows that the display device (video device) and input device interface use standard signals, supported by many systems. For example, DVI can be used for video and USB-, PS/2-, LAN-, and/or Serial-Console for input devices. Any standard display device and/or input device that supports these data formats can be integrated. The input device preferably is a keyboard, a mouse and/or a touch screen. The position especially is a position of a cursor, and/or a mouse pointer position and/or a touched position on the display device.

According to a preferred embodiment of the invention, the other computing device (slave system) supports absolute positioning of the pointing device (for example cursor or mouse pointer position).

According to a preferred embodiment of the invention, the image composing unit is an image compositing unit being adapted for combining image components for displaying on the display device, the image components are related to: the one computing device and at least one other computing device; or a plurality of further computing devices. The image component(s) of the one computing device is/are located in the display area section(s) related to the one computing device and the image component(s) of the other computing device(s) is/are located in the display area section(s) related to said other computing devices.

According to another preferred embodiment of the invention, the one computing device is adapted for receiving requests for displaying the image components of the computing devices and for partition the display area into the display area sections according to said image components.

According to another preferred embodiment of the invention, the one computing device is further adapted for controlling the visibility of its own at least one image component, wherein any image component related to another computing device cannot hide the image component of the one computing device. Preferably the display area sections are formed in such way that the image components related to the one computing device are always visible.

Visual integration (common graphics output) of heterogeneous computing devices with the one computing device and one or more other computing devices with single operation by means of shared input devices leads to the user-experience of one single overall computing system. The user will not notice the presence of the actual device boundaries when transitioning across them, e.g. when using the mouse pointer or touch screen input.

The one computing device is adapted for receiving requests for displaying the image components of the other computing devices. If another computing device wants a new image component to be displayed or moves the position of one of its existing image components, it will inform the one computing device via a communication channel.

Even when the other computing device or all other computing devices are unavailable or have failed, the image component(s) of the one computing device is/are still visible and can be operated by the input device at any time.

According to yet another preferred embodiment of the invention, the image compositing unit is adapted for receiving a set of source signals, wherein each source signal is related to an according computing device; determining a key information from a first source signal of the one computing device and switching between the source signals of the different image sources in dependence of the determined key information to create the common video signal.

According to yet another preferred embodiment of the invention, the image compositing unit comprises a key detection unit for determining the key information from the first source signal; a multiplexer unit for switching between the different source signals to create the video output signal; and an image compositing controller device for controlling the switching of the multiplexer unit in dependence of the determined key information.

Preferably, the key information is a chroma key (chroma key information) and the key detection unit is a chroma key detection unit. The image composing unit comprises a chroma key detection unit, which controls the multiplexer unit to switch between the source signals from the one computing device and each of the other computing devices. When a certain chroma key is detected, the multiplexer unit switches to the assigned pixel source, the other computing device. This functionality is similar to the chroma keying used in TV productions.

Other chroma keys might be defined which generate the weighted average of two of the source signals (instead of selecting only one signal) to generate the impression of semi-transparency.

The image composing unit (image compositing unit) preferably is adapted for operation even if one or all other computing devices fail and only the one computing device transmits a corresponding source signal.

There are several possible implementations to meet the above requirement: Synchronize all computing devices to a pixel clock of the one computing device. In case of only one other computing device, the pixel clock of the one computing device is synchronized to the other computing device. The synchronization is stopped when the pixel clock of the other computing device fails. All computing devices (as image sources) with an independent, reliable clock are captured using a frame buffer.

According to another preferred embodiment of the invention, the image compositing unit further comprises a synchronization verification unit for verifying the synchronization of the source signals.

Especially the image compositing unit further comprises an image scaling unit and/or a picture-in-picture display data generating unit. The image scaling unit or the picture-in-picture display data generating unit might be added to any of the video inputs to allow different resolutions and timings for each input.

Preferably, the image compositing unit is further configured for synchronizing at least one of the other source signals to the first source signal.

The invention further relates to a method for operating a computing system for operating a plurality of computing devices, the computing system comprising one of the computing devices and an image composing unit for generating a common video signal for a display device, wherein said method comprises the steps of: partitioning a display area of the display device into a plurality of display area sections wherein at least one of the display area sections is related to at least one other computing device; receiving an input signal from at least one input device, wherein the input signal is relatable to a position within the display area; and providing the at least one other computing device with the input signal depending on the position being in one of the display area sections related to said other computing device.

Especially, the method comprises a further step of combining image components for being displayed on the display device, the image components are related to the one computing device and at least one other computing device 14, 16 or a plurality of further computing devices.

Preferably, the method comprises a further step of controlling the visibility of its own at least one image component, wherein any image component related to another computing device cannot hide the image component of the one computing device.

The invention further relates to computer program for use in a computing system, especially an aforementioned computing system, for operating a plurality of computing devices, the computing system comprising one of the computing devices and an image composing unit for generating a common video signal for a display device, wherein said computer program comprises computer instructions for: partitioning a display area of the display device into a plurality of display area sections, wherein at least one of the display area sections is related to at least one other computing device; receiving an input signal from at least one input device, wherein the input signal is relatable to a position within the display area; providing the at least one other computing device with the input signal depending on the position being in one of the display area sections related to said other computing device.

The technical effects necessary according to the invention can thus be realized on the basis of the instructions of the computer program in accordance with the invention. Such a computer program can be stored on a carrier such as a CD-ROM or it can be available over the internet or another computer network. Prior to execution, the computer program is loaded into the computing device (computer) by reading the computer program from the carrier, for example by means of a CD-ROM player, or from the internet, and storing it in the memory of the computer. The computing device includes inter alia a central processor unit (CPU), a bus system, memory means, e. g. RAM or ROM, storage means, e. g. floppy disk or hard disk units and input/output units.

The aforementioned components, as well as the claimed components and the components to be used in accordance with the invention in the described embodiments, are not subject to any special exceptions with respect to their size, shape, material selection and technical concept such that the selection criteria known in the pertinent field can be applied without limitations.

Additional details, features, characteristics and advantages of the object of the invention are disclosed in the subclaims, the figures and the following description of the respective figure and examples, which—in an exemplary fashion—show embodiments and examples of a computing system according to the invention.

DETAILED DESCRIPTION OF EMBODIMENTS

Figure 1:
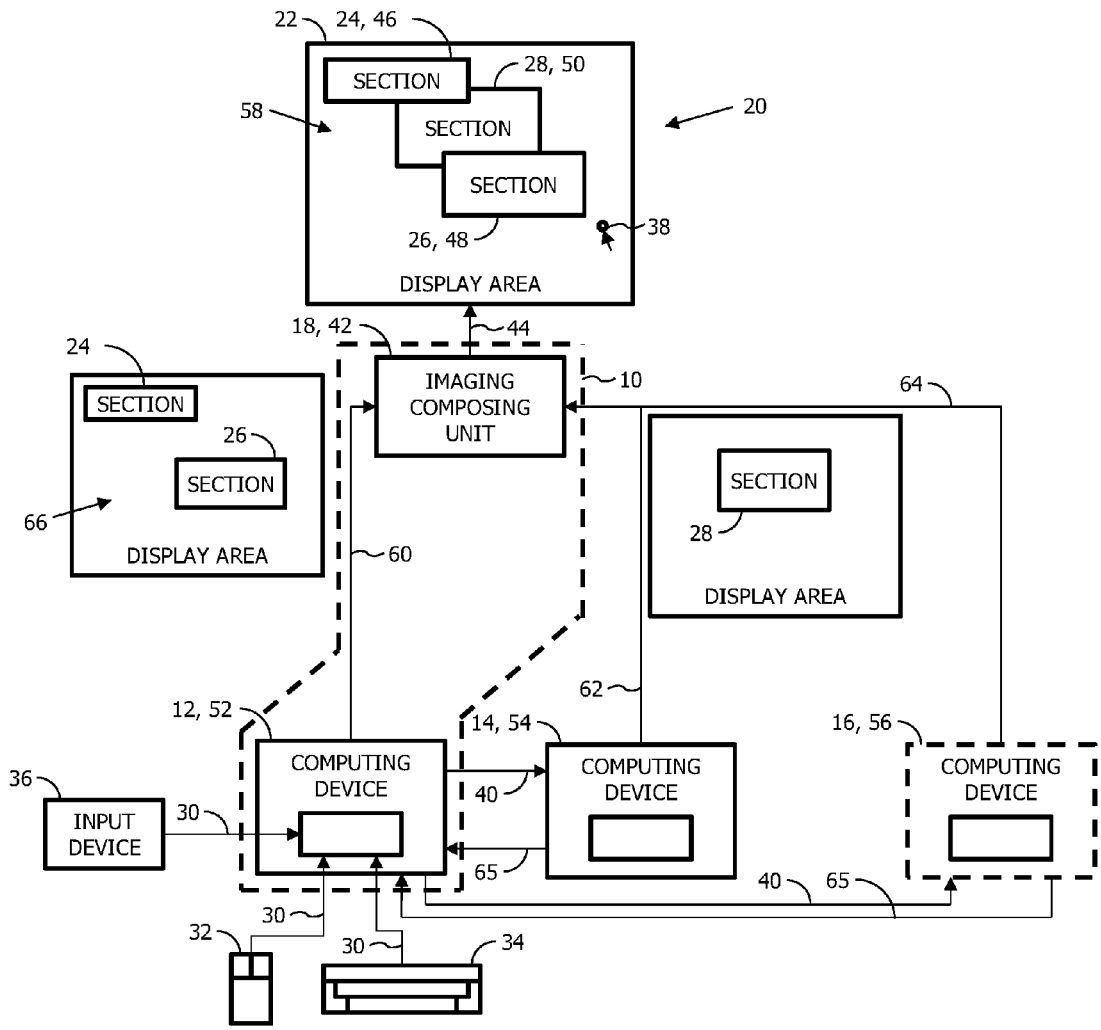
FIG. 1 presents a schematic overview of a computing system for operating a plurality of computing devices, the computing system comprising one of the computing devices being a one computing device and an image composing unit for generating a video signal for a display device.

FIG. 1 shows a schematic overview of a computing system 10 for operating a plurality of computing devices 12, 14, 16, wherein one of the computing devices 12, 14, 16 is the one computing device 12 being part of the computing system 10. The computing system 10 comprises beside the one of the computing devices 12 an image composing unit 18 for generating a video signal for a display device 20. The one computing device 12 is a master computing device 12 adapted for partitioning a display area 22 of the display device 20 in a plurality of display area sections 24, 26, 28 and relating one of the display area sections 24, 26 to the one computing device 12 and/or at least one of the display area sections 28 to another computing device 14 communicatively connectable to the computing system 10. The one computing device 12 is further adapted for receiving an input signal (arrow 30) from at least one (physical) input device 32, 34, 36, wherein the input signal (arrow 30) is relatable to a position 38 within the display area 22. The one computing device 12 is further adapted for providing the other computing device 14, 16 with the input signals (virtual input signals: arrows 40) depending on the position 38 being located in one of the display area sections 24, 26, 28 allocated to the corresponding further computing devices 14, 16. The display area sections 24, 26, 28 may have any type of shape, not limited to rectangles as depicted in FIG. 1.

The image composing unit 18 is an image compositing unit 42 for generating a common video signal (arrow 44) for the display device 20, which compositing unit 42 is adapted for combining image components 46, 48, 50 from the one computing device 12 and the further computing device(s) 14, 16. The one computing device 12 is adapted for controlling the visibility of its own at least one image component 46, 48, wherein any image component 50 contributed by the other computing device 14, 16 cannot hide this component 46, 48.

If another computing device 14, 16 wants a new image component 50 to be displayed or moves the position of one of its existing image component 50, it will inform the one computing device 12 via a communication channel (arrow 65).

Figure 2:
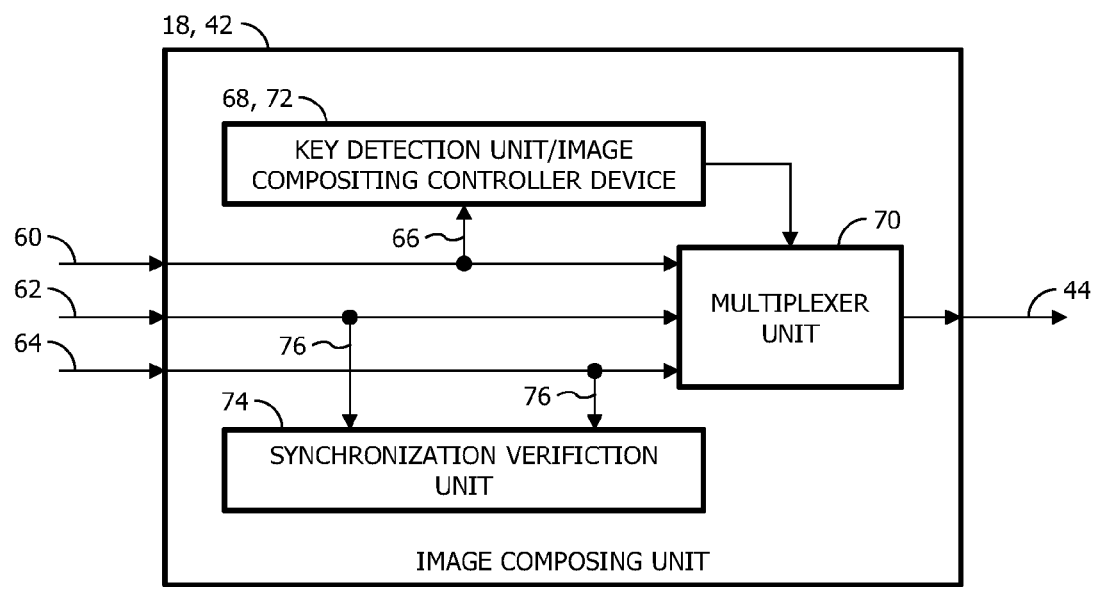
FIG. 2 presents a schematic view of a preferred embodiment of an image composing unit being an image compositing unit according to one embodiment of the invention.

FIG. 2 shows the image compositing unit 42, which can be perceived as a "black box" for combining image components from separate image sources 52, 54, 56 to one output signal (arrow 44) for generating a common image 58, the compositing unit 42 is adapted for: receiving a set of source signals (arrows 60, 62, 64), wherein each source signal is related to an according image source 52, 54, 56; determining a key information 66, especially a color coded key information or chroma key information 66, from the first source signal of the first image source 52; and switching between the source signals of the different image sources 52, 54, 56 in dependence of the determined key information 66 to create the output signal.

The compositing unit 42 comprising a key detection unit 68, especially a chroma key detection unit 68, which controls a multiplexer unit 70 to switch between the pixel stream from the one computing device 12 and the other computing device(s) 14, 16. When a certain chroma key is detected, the multiplexer unit 70 switches to the assigned image source 52, 54, 56. This functionality is similar to the chroma keying used in TV productions.

Additional chroma key information might be defined which generate the weighted average of two of the channels of source signals (instead of selecting only one channel) to generate the impression of (semi-)transparency.

The image compositing unit 42 further comprises an image compositing controller device 72 for controlling the switching of the multiplexer unit 70 in dependence of the determined key information 66 and a synchronization verification unit 74 for verifying the synchronization of the source signals (arrows 76).

The image composing unit 18 preferably is constructed in a way that it still operates even if one or all other computing devices 14, 16 fail and only the one computing device 12 generates pixel data.

There are several possible implementations to meet the above requirement: Synchronize all computing devices 12, 14, 16 to a pixel clock of the one computing device 12.

In case of only one other computing device 14: synchronize the one computing devices pixel clock to the other computing device 14, and automatically stop this synchronization if the pixel clock of the other computing device 14 fails; use a frame buffer and capture all pixel sources with an independent, reliable clock.

An image scaling unit or a picture-in-picture unit (not shown) might be added to any of the video inputs to allow different resolutions and timings for each input.

With the prior art solutions it is not possible to integrate a heterogeneous system with a plurality of other computing devices 14, 16 in a way that makes the combination appear like one single computing system 10.

Existing methods (not according to the invention) for operating a computing system 10 for operating a plurality of computing devices have disadvantages in these areas: the mixture of devices that can be combined (no heterogeneous systems can be built); the type of devices that can be combined (they may need heavy modifications to hardware or software, cannot use of-the-shelf components); and the quality of integration (not smooth or seamless, especially with respect to operating).

The computing system 10 for operating a plurality of computing devices 12, 14, 16 according to the different embodiments opens up different advantageous options.

Screen Partitioning (Handling of Screen Objects): The one computing device 12 defines which display area sections 24, 26, 28 of the display area 22 show the image components (screen objects) 46, 48, 50 of which device by using a defined chroma key for each other computing device 14, 16 and painting these areas on its own display with the according chroma key. Therefore the one computing device 12 is aware of the intended position of all image components on the display device 20.

The one computing device 12 controls priority in case of overlapping image components.

At any time, the one computing device 12 can make its own image components visible for displaying important information that must not be covered by image components from the other computing devices.

If another computing device 14, 16 wants a new image component to be displayed or moves the position of one of its existing image components, it will inform the one computing device 12 via a communication channel 65. If the desired position of the image component is approved by the one computing device, it will paint the area for that image component on its display device with the appropriate key being a chroma key to make it visible in the resulting image. If the position is not approved by the one computing device, the image component will not be visible. The one computing device 12 might inform the other computing device 14, 16 about this.

A special case is the presence of only one other computing device (Slave system). In this case the one computing device 12 might assign the majority of the display to the slave computing device and display its image components "on top", using display area sections which cover only parts of the other computing device's display device.

In this configuration, the other computing device 14, 16 does not need to inform the one computing device 12 about creation or movement of its image components. Since image components from the one cover some parts of the display area section allocated to the other computing device, the one computing device 12 might make these components semi-transparent to make the user aware of the covered parts.

When the complete screen of the other (slave) device is displayed on the display device using a picture-in-picture mechanism, the other computing device can position its image components without intervention of the one computing device.

Input Focus Tracking: By knowing component placement and the position 38 of the input device 32 being a mouse, the one computing device 12 tracks which computing device 12, 14, 16 has focus, i.e. which computing device currently "owns" the input devices 32, 34, 36. The one computing device 12 manages the change of focus in the following way:

Via keyboard: The one computing device 12 implements a method to allow the user to change between the computing devices using a special keyboard shortcut (e.g. like Alt-Tab in Windows).

Via Mouse click or Touch: With a click or touch event the input focus might be assigned to the owner of the image component on the current mouse pointer position (Microsoft Windows like).

Via Mouse Movement: The input focus might be assigned to the owner of the image component on the current mouse pointer position (Unix like).

The current focus is visualized to the user by means of the individual computing device (system). To avoid showing active focus on more than one computing device at a time, the focus should be actively removed from the previous focus owner when transitioning to another device.

Achieving the effect of removing the focus from another computing device 14, 16 might be done by means of a simulated mouse click on the desktop (e.g. bottom right corner) or a simulated mouse click on an invisible window in the foreground at a known position. Alternatively, a message could be sent to the other computing device, which then takes measures to remove the focus.

On the one computing device, the loss-of-focus might be made visible by means of making the one computing device's display devices objects semi-transparent.

Keyboard Events: Keyboard events are forwarded to that computing device which currently has the focus and are suppressed for all other computing devices.

In addition, the keyboard might also be used for overall device control functions: Special key sequences might be defined to perform switching to a One-only full screen display or reset the whole system. This removes the necessity to have other "hard-keys" like a "reset button" for these special purposes.

Mouse and Trackball Events—Movement: The mouse pointer position preferably is synchronized across all devices to avoid jumping of the pointer when crossing display area section boundaries on the display. The simulated mouse input device uses absolute positioning of the pointer instead of the relative positioning of a traditional mouse to achieve this. At any time only one instance of the mouse pointer is visible on the display so there is no problem with overlapping mouse pointer bitmaps as painted by different systems, or mouse movement delay artifacts.

Click Events: Mouse click events are forwarded to the computing device that owns the image component below the current mouse pointer position.

Touch Events: The computing system receives the physical touch input events, and forwards them to the computing device which owns the image component below the current touch position.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A non-transitory computer readable medium for use in a computing system for operating a plurality of computing devices, the computing system comprising one of the computing devices and an image composing unit for generating a common video signal for a display device, wherein said non-transitory computer readable medium carries computer instructions that, when executed by at least one processor or computer, controls the at least one processor or computer for:

partitioning a display area of the display device into a plurality of display area sections corresponding to source signals of the computing devices by painting the display area sections on a display of the one computing device with key information identifying corresponding source signals, wherein at least one of the display area sections is related to at least one other computing device, wherein the display is output as a first source signal of the source signals, and wherein a composite display area section of the display area sections is painted with key information designating a weighted average of two source signals;

determining key information from the first source signal of the one computing device;

determining a weighted average of the two source signals according to the determined key information;

switching between the source signals of the computing devices and the weighted average based on the determined key information to create the common video signal;

receiving an input signal from at least one input device, wherein the input signal corresponds to a position within the display area, the position being in a display area section corresponding to a target computing device of the computing devices;

providing the input signal to the target computing device;

synchronizing the two source signals; and when one of the at least one other computing device fails, capturing the source signals of all of the computing devices with:
(i) a frame buffer; and
(ii) an independent clock.

2. The non-transitory computer readable medium according to claim 1, wherein the computer instructions further control the at least one processor or computer for:

receiving a request for a new display image component from another computing device;

in response to receiving the request, painting a new display area section on the display of the one computing device with key information corresponding to the new display image component;

receiving a move request to move an existing image component from another computing device; and in response to the move request, reposition a display area section corresponding to the existing image component on the display.

3. The non-transitory computer readable medium according to claim 1, wherein the computer instructions further control the at least one processor or computer for:

synchronizing the first source signal of the one computing device to the other of the two source signals.

4. The non-transitory computer readable medium according to claim 1, wherein the computer instructions further control the at least one processor or computer for:

synchronizing the other of the two source signals to the first source signal of the one computing device.

5. The non-transitory computer readable medium according to claim 1, wherein the computer instructions further control the at least one processor or computer for:

verifying the synchronization of the source signals.

6. A system for operating a plurality of computing devices, the system comprising:

one of the computing devices and an image composing unit configured to generate a common video signal for a display device;

the one computing device configured to:
receive requests for displaying the image components of the computing devices;

partition a display area of the display device into a plurality of display area sections by painting the display area sections on an individual display of the one computing device with corresponding key information, the individual display being output by the one computing device as a first source signal, wherein at least one of the display area sections is related to at least one other computing device;

receive an input signal from at least one input device, wherein the input signal is relatable to a position within the display area; and provide the at least one other computing device with the input signal depending on the position being in one of the display area sections related to said other computing device;

wherein the image composing unit is an image compositing unit configured to combine image components for displaying on the display device; and wherein the image components are related to:
the one computing device and the at least one other computing device; or
a plurality of other computing devices;

wherein the image compositing unit is configured to:
receive a set of source signals, including the first source signal, wherein each source signal is related to a corresponding computing device;

determine a key information from the first source signal of the one computing device;

based on the determined key information, determine a weighted average of two source signals of the set of source signals; and switch between the source signals and the weighted average based on the determined key information to create the common video signal; and wherein the one computing device is further configured to:
paint a weighted section on the individual display of the one computing device with key information designating the weighted average of the two source signals;

receive a move request from an another computing device to move an existing image component to a desired position;

determine that the desired position is not approved; and in response to the desired position not being approved, inform the another computing device that the existing image component will not be visible.

7. The system according to claim 6, wherein the one computing device is configured to:

receive requests for displaying the image components of the computing devices and to partition the display area into the display area sections according to said image components by painting the display area sections on a display of the one computing device with corresponding key information, the display is output by the one computing device as the first source signal;

receive a request for a new display image component from another computing device;

in response to receiving the request, paint a new display area section on the display of the one computing device with key information corresponding to the new display image component;

receive a second move request to move a second existing image component from another computing device; and in response to the second move request, reposition a display area section corresponding to the second existing image component on the display.

8. The system according to claim 6, wherein the one computing device is further configured to control whether its own at least one image component is visible on the display device, wherein any image component related to another computing device cannot hide the image component of the one computing device.

9. The system according to claim 6, wherein the image compositing unit is further configured to:

determine the key information from the first source signal;

switch between the different source signals to create the common video output signal; and control the switching in dependence of the determined key information.

10. The system according to claim 6, wherein the image compositing unit is further configured to verify synchronization of the source signals.

11. The system according to claim 6, wherein the image compositing unit further comprises an image scaling unit and/or a picture-in-picture display data generating unit.

12. The system according to claim 6, wherein the image compositing unit is further configured to synchronize at least one other source signal of the set of source signals to the first source signal by synchronizing pixel clocks of the computing devices.

13. The system according to claim 6, wherein said one computing device is further configured to control a priority of overlapping display area sections.

14. The system according to claim 6, wherein said one computing device is further configured to synchronize mouse pointer locations corresponding to the computing devices.

15. The system according to claim 6, wherein the one computing device is further configured to:
if the desired position is approved, paint an area for the image component on the display device with a chroma key which makes the image component visible on the display device.

16. A method for operating a computing system for operating a plurality of computing devices, the computing system comprising the computing devices and an image composing unit, said method comprising:
with the image composing unit:
receiving a set of source signals, each source signal representing a display of one of the computing devices;
determining key information from a first source signal of the set of source signals corresponding to a first computing device;
based on the determined key information, determining a weighted average of the two source signals;
switching between the source signals and the weighted average based on the determined key information to create a common video signal representing a display of the image composing unit; and
outputting the common video signal to a display device; and
with the first computing device:
partitioning the display of the imaging composing unit into a plurality of sections by painting the sections on the display of the first computing device with corresponding key information;
receiving a request for a new display image component from another computing device;
in response to receiving the request from the other computing device, painting a new section on the display of the first computing device with key information corresponding to the new display image component;
receiving an input signal from an input device designating a position on the display of the display device corresponding to the new section;
providing the other computing device with the input signal;
painting a weighted section on the display of the first computing device with key information designating the weighted average of the two source signals;
receiving a move request from the another computing device to move an existing image component to a desired position;
determine that the desired position is not approved; and
in response to the desired position not being approved, inform the another computing device that the existing image component will not be visible.

17. The method according to claim 16, further including:
receiving a second move request to move a second existing image component from another computing device; and
repositioning a display area section corresponding to the second existing image component on the display based on the second move request.

18. The method according to claim 16, wherein display area sections are individually focused by corresponding computing devices, and wherein the method further includes:
removing active focus of a display area section when transitioning to another display area section by sending a signal to the corresponding computing device of the display area section.

19. The method according to claim 16, further comprising, with the first computing device:
using absolute positioning of a pointer, synchronizing, across each computing device of the computing devices, mouse pointer locations of the computing devices.

20. The system according to claim 6, wherein the computing devices are each configured to visualize focus of corresponding display area sections, wherein said one computing device is further configured to:
remove active focus of a display area section related to another computing device when transitioning to another display area section by sending a signal to the other computing device to remove focus.

21. The method according to claim 16, further comprising:
synchronizing the two source signals; and
stopping the synchronization when a pixel clock of the another computing device fails.

* * * * *